United States Patent
Rubinstein et al.

(10) Patent No.: US 9,485,499 B2
(45) Date of Patent: Nov. 1, 2016

(54) SYSTEM AND METHOD FOR PROCESSING MULTICAMERA ARRAY IMAGES

(71) Applicant: Israel Aerospace Industries Ltd., Lod (IL)

(72) Inventors: Ron Rubinstein, Gan Yavne (IL); Victor Gostynski, Ashdod (IL); Michael Abraham, Rishon le Zion (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/360,134

(22) PCT Filed: Nov. 22, 2012

(86) PCT No.: PCT/IL2012/050473
§ 371 (c)(1),
(2) Date: May 22, 2014

(87) PCT Pub. No.: WO2013/076728
PCT Pub. Date: May 30, 2013

(65) Prior Publication Data
US 2014/0354828 A1    Dec. 4, 2014

(51) Int. Cl.
*H04N 17/00* (2006.01)
*G06T 7/00* (2006.01)
*G06T 3/00* (2006.01)
(Continued)

(52) U.S. Cl.
CPC .......... *H04N 17/002* (2013.01); *G06T 3/0068* (2013.01); *G06T 3/4038* (2013.01); *G06T 7/0018* (2013.01); *G06T 7/0028* (2013.01); *G06T 2207/10032* (2013.01);
(Continued)

(58) Field of Classification Search
CPC .............. H04N 17/002; H04N 5/247; H04N 5/23238; G06T 7/0018; G06T 7/0028; G06T 3/0068; G06T 3/4038; G06T 2210/56; G06T 2207/10032; G06T 2207/30181
See application file for complete search history.

(56) References Cited

U.S. PATENT DOCUMENTS 4,393,410 A    7/1983  Ridge et al.
5,638,461 A  * 6/1997  Fridge .................... G01N 21/88
                                                    348/190
(Continued)

FOREIGN PATENT DOCUMENTS

CN    1873389 A    12/2006
CN    1988545 A    6/2007
(Continued)

OTHER PUBLICATIONS

Bennett Wilburn "High Performance Imaging Using Arrays of Inexpensive Cameras" Diss.S tanford University. 1-128 (Dec. 2004).
(Continued)

*Primary Examiner* — Brian Yenke
(74) *Attorney, Agent, or Firm* — Browdy and Neimark, PLLC

(57) ABSTRACT

A system for calibrating multi-camera array images, comprising an array of at least four acquisition devices, configured to acquire images; at least one reference acquisition device configured to acquire at least one reference image at least partially overlapping at least four of the images; and a processor configured to extract tie points between the at least four of the images and the at least one reference image and utilize the tie points for calibrating the at least four of the images in respect of the at least one reference image.

22 Claims, 9 Drawing Sheets

(51) Int. Cl.
   *G06T 3/40* (2006.01)
   *H04N 5/247* (2006.01)
   *H04N 5/232* (2006.01)
(52) U.S. Cl.
   CPC ...... *G06T 2207/30181* (2013.01); *G06T 2210/56* (2013.01); *H04N 5/23238* (2013.01); *H04N 5/247* (2013.01)

(56) References Cited

U.S. PATENT DOCUMENTS

| | | | |
|---|---|---|---|
| 6,002,743 A | 12/1999 | Telymonde | |
| 6,219,099 B1 | 4/2001 | Johnson et al. | |
| 6,292,171 B1 | 9/2001 | Fu et al. | |
| 6,393,163 B1 | 5/2002 | Burt et al. | |
| 6,476,812 B1* | 11/2002 | Yoshigahara | G06T 17/00 345/427 |
| 6,525,772 B2 | 2/2003 | Johnson et al. | |
| 6,670,596 B2 | 12/2003 | Tsai et al. | |
| 6,695,451 B1 | 2/2004 | Yamasaki et al. | |
| 6,804,406 B1 | 10/2004 | Chen | |
| 6,928,194 B2* | 8/2005 | Mai | G06T 3/4038 345/630 |
| 6,931,340 B2 | 8/2005 | Jackson et al. | |
| 7,062,397 B1* | 6/2006 | Minor | G03F 7/70725 702/85 |
| 7,193,645 B1 | 3/2007 | Aagaard et al. | |
| 7,215,362 B2 | 5/2007 | Klose | |
| 7,245,318 B2 | 7/2007 | Shirakawa | |
| 7,306,341 B2 | 12/2007 | Chang | |
| 7,420,590 B2 | 9/2008 | Matusik et al. | |
| 7,602,990 B2 | 10/2009 | Matusik et al. | |
| 7,706,634 B2 | 4/2010 | Schmitt et al. | |
| 7,860,302 B2* | 12/2010 | Sato | G06T 7/0022 382/154 |
| 7,925,114 B2 | 4/2011 | Mai et al. | |
| 8,164,617 B2* | 4/2012 | Mauchly | G06T 7/0075 348/14.01 |
| 8,514,491 B2 | 8/2013 | Duparre | |
| 8,665,316 B2* | 3/2014 | Gruber | G01C 11/025 348/222.1 |
| 2002/0122113 A1 | 9/2002 | Foote | |
| 2002/0163582 A1 | 11/2002 | Gruber et al. | |
| 2005/0134599 A1 | 6/2005 | Nayar et al. | |
| 2006/0181610 A1* | 8/2006 | Carlsson | G06T 7/002 348/159 |
| 2006/0221072 A1* | 10/2006 | Se | G01C 11/06 345/420 |
| 2007/0171380 A1 | 7/2007 | Wright et al. | |
| 2007/0189765 A1 | 8/2007 | Schulte | |
| 2008/0181488 A1* | 7/2008 | Ishii | B60R 1/00 382/154 |
| 2008/0259223 A1 | 10/2008 | Read et al. | |
| 2009/0040322 A1 | 2/2009 | Leberl et al. | |
| 2009/0066968 A1* | 3/2009 | Ikeda | G01B 11/245 356/602 |
| 2009/0153745 A1 | 6/2009 | Park et al. | |
| 2009/0256909 A1 | 10/2009 | Nixon | |
| 2009/0299674 A1 | 12/2009 | Williams et al. | |
| 2010/0013927 A1* | 1/2010 | Nixon | G01C 11/06 348/144 |
| 2010/0067828 A1 | 3/2010 | Kube et al. | |
| 2010/0295855 A1 | 11/2010 | Sasakawa et al. | |
| 2011/0090337 A1* | 4/2011 | Klomp | H04N 7/18 348/144 |
| 2011/0122223 A1 | 5/2011 | Gruber et al. | |
| 2011/0157396 A1* | 6/2011 | Kotani | H04N 5/232 348/222.1 |
| 2011/0211046 A1 | 9/2011 | Stumber et al. | |
| 2012/0075435 A1* | 3/2012 | Hovanky | H04N 13/02 348/51 |
| 2013/0070108 A1* | 3/2013 | Aerts | G06T 7/002 348/187 |
| 2013/0113876 A1* | 5/2013 | Zhao | G06T 7/0018 348/38 |
| 2014/0270537 A1* | 9/2014 | Lo | G06T 11/60 382/195 |

FOREIGN PATENT DOCUMENTS

| | | |
|---|---|---|
| CN | 101127128 A | 2/2008 |
| CN | 101216745 A | 7/2008 |
| CN | 100420259 C | 9/2008 |
| CN | 101321301 A | 12/2008 |
| CN | 101365140 A | 2/2009 |
| CN | 101420520 A | 4/2009 |
| CN | 101551907 A | 10/2009 |
| CN | 101551918 A | 10/2009 |
| CN | 101556696 A | 10/2009 |
| CN | 101571667 A | 11/2009 |
| CN | 101582165 A | 11/2009 |
| CN | 101593350 A | 12/2009 |
| CN | 101616336 A | 12/2009 |
| CN | 100588269 C | 2/2010 |
| CN | 101651844 A | 2/2010 |
| DE | 102007024638 A1 | 1/2008 |
| JP | 2004135209 A | 4/2004 |
| JP | 2009109322 A | 5/2009 |
| KR | 20090082816 A | 7/2009 |
| KR | 20100007506 U | 7/2010 |
| WO | 2008148291 A1 | 12/2008 |

OTHER PUBLICATIONS

Matthew Brown et al "Invariant Features From Interest Point Groups" BMVC 253-262 (2002).
Robert M. Haralick et al "Computer and Robot Vision" Reading MA Addison-Wesley. 2 : 332-348 (1993).
Peter J. Burt et al "A Multiresolution Spline with Application to Image Mosaics" AMC Trans. Graph 2:4:217-236 (Oct. 1983).
Wilburn, Bennett "Bennett wilburn" http://graphics.stanford.edu/~wilburn/ (2010).
"Sensor" GIS. http://en.mimi.hu/gis/sensor.html (2011).
Jacobsen: "Calibration of Camera Systems", ASPRS 2008 Annual Conference, Portland, Oregon, Apr. 28, 2008, pp. 1-8.
Zitova B et al: "Image Registration Methods: A Survey", Image and Vision Computing, Elsevier, Guildford, GB, vol. 21, No. 11, Oct. 1, 2003, pp. 977-1000.
Ming-Sui Lee et al: "Pixel and compressed-domain color matching techniques for video mosaic applications", Visual Communications and Image Processing; San Jose, Jan. 20, 2004, Proc. of SPIE-IS&T Electronic Imaging, SPIE vol. 5308.

* cited by examiner

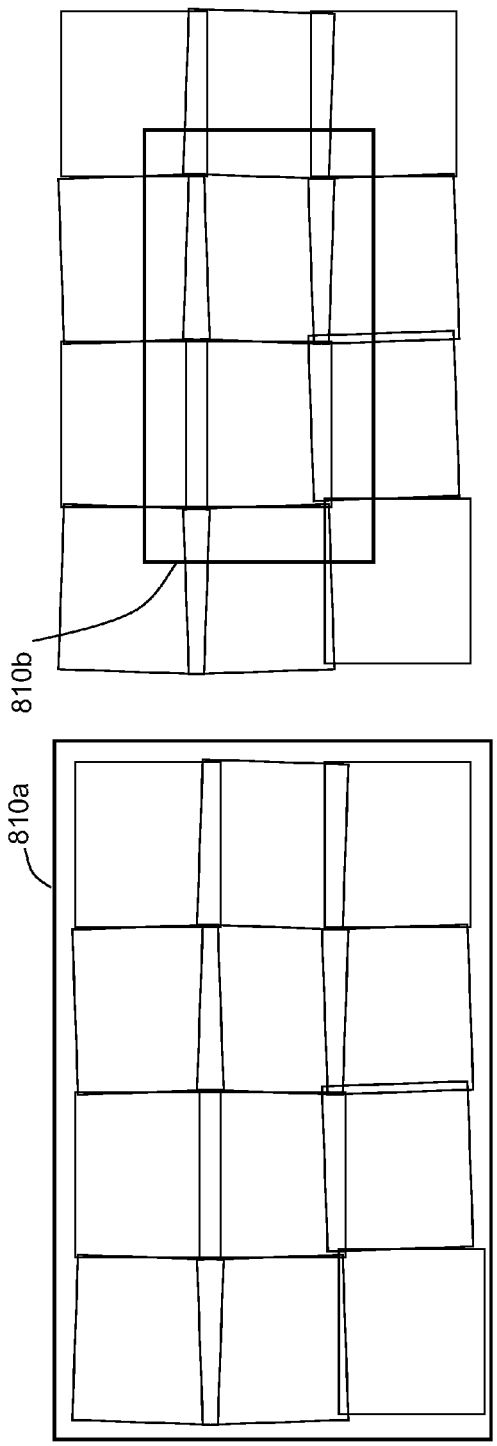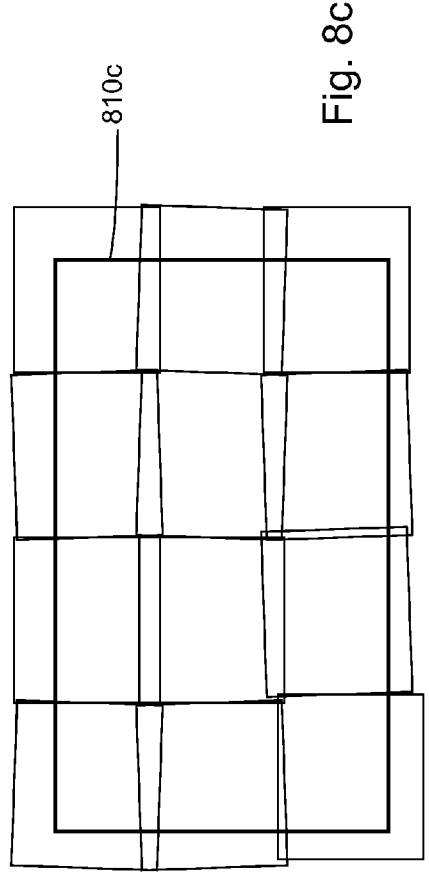
Fig. 8a
Fig. 8b
Fig. 8c

SYSTEM AND METHOD FOR PROCESSING MULTICAMERA ARRAY IMAGES

FIELD OF THE INVENTION

This invention relates to multi-camera arrays and more specifically to calibration and adjustment of images acquired by multi-camera arrays.

BACKGROUND OF THE INVENTION

Various methods exist for calibrating and adjusting images. For this purpose, most of these methods utilize previously captured images. In light of the fact that many changes can occur over time, using previously captured images may impose inaccuracies and difficulties to the calibration and adjustment process. In some cases, such previously captured images (sometimes captured months and even years ago) can be irrelevant due to the fact that the scene has changed in a way that prevents utilization of such previously captured images for calibrating and adjusting newly acquired images.

There is thus a need in the art to provide a system and method for calibration and adjustment of images acquired by multi-camera arrays.

References considered to be relevant as a background to the invention are listed below. Listings of the references herein is not to be inferred as admitting that these are in any way relevant to the patentability of the presently disclosed subject matter disclosed herein. In addition, references cited in the application are not necessarily admitted as being prior art.

U.S. Pat. No. 7,706,634 (Schmitt et al.) issued Apr. 27, 2010, discloses a camera for optically capturing a screen, wherein the screen has an area and wherein a predetermined overall resolution is provided for the optical capture, comprises a camera support with an array of camera mounts, an array of optical individual cameras as well as an image processing device for processing digital individual images of the array of optical individual cameras to generate the optical capture of the screen with the predetermined overall resolution. The image processing device is effective to reduce a correction of the individual images with regard to alignment inaccuracies and/or parameter variations, wherein for correction purposes a correction resolution is used, which is higher than the overall resolution, and wherein for every individual camera an individual correction rule is used for the correction. After the correction has been performed, the corrected overall image is brought to the predetermined overall resolution by combining adjacent pixels. Thereby, with inexpensive individual cameras, an image of a large-format screen is obtained efficiently, inexpensively and with little artifacts.

Chinese patent No. 101551907 (Changyu et al.) issued Oct. 7, 2009, discloses a method for multi-camera automated high-precision calibration, including the following steps: 1. setting calibration object; 2. screening calibration pictures; 3. extracting feature points of the screened calibration pictures; 4. matching the feature points; 5. putting information of the matched feature points into W matrix to repair the missing W matrix; 6. using the Tomas svoboda algorithm to decompose the repaired W matrix for calculating internal and external parameter of the cameras. The invention provides a method for multi-camera automated high-precision calibration with simple calibration object set, which can calibrate automatically with high-precision and high-speed.

Chinese patent No. 1014205020 (Huimin et al.) issued Apr. 29, 2009, discloses a unification calibration method for multiple camera arrays; in the method, cameras with different resolutions make up a multiple camera array system; the method comprises the following steps: 1. pairwise cameras with high resolutions are calibrated so as to obtain the initial value of inner parameters of every camera with high resolution and the initial value of conversion parameters among the cameras with high resolutions; 2. The unification calibration is carried out on the camera with high resolution so as to obtain the inner parameters of every camera with the high resolution and the final value of the conversion parameters among the cameras with the high resolutions; 3. The unification calibration is carried out on the camera with the high resolution and the camera with the low resolution so as to obtain the final resolution of the conversion parameters between the cameras with the low resolutions and the cameras with the high resolutions. The unification calibration method has the advantages of high calibration precision, guaranteeing the robustness and being suitable for the camera array system with the different resolutions.

U.S. Pat. No. 6,804,406 (Chen et al.) issued Oct. 12, 2004, discloses calibrating a seamless tiled display image having multiple overlapping discrete images produced by multiple displays including generating a display-to-screen spatial transformation function to reduce one or more undesirable geometric projector characteristics for each of the projectors used in the tiled display. The method includes generating a screen-to-camera spatial transformation function to reduce one or more undesirable geometric camera characteristics for each of the cameras used in capturing the tiled display images used in the calibration. The method requires generating a spatial luminance transformation function for effective color calibration for each of the display images in the tiled display. The method requires inputting a high-resolution image into a tiled display processor to form the tiled images of the tiled display, segmenting the inputted high-resolution image to form tiled images based on an array of images used in the tiled display, and pre-warping each of the segmented tiled images using the display-to-screen spatial transformation function to reduce the one or more non desirable geometric projector characteristics. The method requires applying an inverse of the spatial-luminance transformation function to each of the pre-warped images to effectively blend colors in the tiled display images.

U.S. Pat. No. 6,002,743 (Telymonde) issued Dec. 14, 1999, discloses an image acquisition system that uses multiple cameras or image sensors in a redundant camera array. The cameras or sensors are arrayed in rows and columns so that a viewing area of each camera overlaps a viewing area of an adjacent camera. At least one camera is positioned in the array so that all edges of its viewing area abuts the viewing area of an adjacent camera. The image is displayed or stored in seamless and continuous form in high resolution. The system may also be used in low light conditions for image acquisition. Multiple cameras or sensors may be arrayed on modular panels that mates with and adjacent modular panel. The system is adaptable to image acquisition for X-rays, scanning, photocopying, security systems and the like.

U.S. Pat. No. 7,420,590 (Matusik et al.) issued Sep. 2, 2008, discloses a method and system for determining an alpha matte for a video. A set of videos is acquired by an array of cameras. A centrally located camera in the array is designated as a reference camera and acquires a reference video. A foreground depth plane is selected from the set of videos. A trimap is determined from variances of pixel intensities in each image. Variances of the intensities of pixels labeled as background and pixels labeled as foreground are extrapolated to the pixels labeled as unknown in the trimap. Means of the intensities of the pixels labeled as background are extrapolated to the pixels labeled as unknown to determine an alpha matte for the reference video.

The references cited in the background teach many principles of image calibration that are applicable to the present invention. Therefore the full contents of these publications are incorporated by reference herein for appropriate teachings of additional or alternative details, features and/or technical background.

SUMMARY OF THE INVENTION

In accordance with an aspect of the presently disclosed subject matter, there is provided a system for calibrating multi-camera array images, comprising:
  a. an array of at least four acquisition devices, configured to acquire images;
  b. at least one reference acquisition device configured to acquire at least one reference image at least partially overlapping at least four of the images;
  c. a processor configured to extract tie points between at least four of the images and at least one reference image and utilize the tie points for calibrating at least four of the images in respect of the at least one reference image.

In accordance with an embodiment of the presently disclosed subject matter, there is further provided a system wherein the distance between at least one reference acquisition device and each of the acquisition devices of the array is smaller or equal to:

$$\frac{Z * \cos\alpha}{h * \cos(\alpha + \gamma)} * ArrayCamGSD$$

wherein Z is the minimal vertical distance between the at least one reference acquisition device and the highest ground point in the images and in the at least one reference image;
  h is the distance between the highest ground point in the images and the at least one reference image and the lowest ground point in the images and the at least one reference image;
  $\alpha$ is the elevation angle of the array to the highest ground point in the images and the at least one reference image;
  $\gamma$ is the grazing angle of the array in respect of the average ground plain within the images and the reference images; and
  ArrayCamGSD is the minimal Ground Sampling Distance (GSD) of each of the array cameras.

In accordance with an embodiment of the presently disclosed subject matter, there is further provided a system wherein at least one of the reference images overlaps at least part of each of the images.

In accordance with an embodiment of the presently disclosed subject matter, there is further provided a system wherein at least one of the reference images overlaps the centers of each of the images.

In accordance with an embodiment of the presently disclosed subject matter, there is further provided a system wherein at least one of the reference images overlaps at least half of the area covered by each of the images.

In accordance with an embodiment of the presently disclosed subject matter, there is yet further provided a system wherein the calibrating is at least one of geometric calibrating and radiometric calibrating.

In accordance with an embodiment of the presently disclosed subject matter, there is yet further provided a system wherein the at least one reference acquisition device has at least one superior parameter over the acquisition devices.

In accordance with an embodiment of the presently disclosed subject matter, there is yet further provided a system wherein said at least one reference acquisition device is of superior geometric accuracy.

In accordance with an embodiment of the presently disclosed subject matter, there is yet further provided a system wherein at least one of the array, the acquisition devices and the reference acquisition device is adjustable.

In accordance with an embodiment of the presently disclosed subject matter, there is yet further provided a system wherein the acquisition devices are still cameras.

In accordance with an embodiment of the presently disclosed subject matter, there is yet further provided a system wherein the acquisition devices are video cameras.

In accordance with an embodiment of the presently disclosed subject matter, there is yet further provided a system wherein the at least one reference acquisition device is a still camera.

In accordance with an embodiment of the presently disclosed subject matter, there is yet further provided a system wherein the at least one reference acquisition device is a video camera.

In accordance with an embodiment of the presently disclosed subject matter, there is yet further provided a system wherein at least two of the images are of a narrower field of view than the at least one reference image.

In accordance with an embodiment of the presently disclosed subject matter, there is yet further provided a system wherein the processor is further configured to utilize the at least one reference image for adjusting at least one parameter of more than two of the images.

In accordance with an embodiment of the presently disclosed subject matter, there is yet further provided a system wherein the parameter is a geometrical parameter.

In accordance with an embodiment of the presently disclosed subject matter, there is yet further provided a system wherein the geometrical parameter is one of the following:
  a. Position;
  b. Orientation;
  c. Focal length;
  d. Scale;
  e. Lens distortion.

In accordance with an embodiment of the presently disclosed subject matter, there is yet further provided a system wherein the images and the at least one reference image cover a substantially unchanged scene.

In accordance with an embodiment of the presently disclosed subject matter, there is yet further provided a system wherein the images and the at least one reference image are acquired during a single imaging pass.

In accordance with an embodiment of the presently disclosed subject matter, there is yet further provided a system wherein the images and the at least one reference image are acquired substantially simultaneously.

In accordance with an embodiment of the presently disclosed subject matter, there is yet further provided a system wherein the system is mounted on a moving platform and wherein the time difference between acquiring the at least one reference image and each of the images is smaller or equal to:

$$\frac{Z*\cos\alpha}{h*\cos(\alpha+\gamma)}*ArrayCamGSD/V_{Platform}$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of the array to the highest ground point in the images and the at least one reference image;

γ is the grazing angle of the array in respect of the average ground plain within the images and the reference images;

Array CamGSD is the minimal Ground Sampling Distance (GSD) of each of the array cameras; and $V_{Platform}$ is the velocity of the moving platform.

In accordance with an embodiment of the presently disclosed subject matter, there is yet further provided a system wherein at least one of the images does not overlap any other image of the images.

In accordance with an embodiment of the presently disclosed subject matter, there is yet further provided a system wherein the at least one reference acquisition device is pre-calibrated.

In accordance with an embodiment of the presently disclosed subject matter, there is yet further provided a system further comprising a positioning and orientation utility configured to determine a position and orientation of at least one of the array of acquisition devices and the at least one reference acquisition device.

In accordance with an embodiment of the presently disclosed subject matter, there is yet further provided a system wherein the processor is further configured to associate each of the images with at least one of corresponding global positioning data and orientation data obtained by the positioning and orientation utility.

In accordance with an embodiment of the presently disclosed subject matter, there is yet further provided a system wherein the system is autonomous.

In accordance with an aspect of the presently disclosed subject matter, there is yet further provided a method for calibrating multi-camera array images, comprising:
 a. acquiring at least four images;
 b. acquiring at least one reference image at least partially overlapping at least four of the images;
 c. extracting tie points between the at least four images and the at least one reference image and utilizing the tie points for calibrating the at least four images in respect of the at least one reference image.

In accordance with an embodiment of the presently disclosed subject matter, there is yet further provided a method wherein the images are acquired using an array of at least four acquisition devices and the at least one reference image is acquired using at least one reference acquisition device, and wherein the distance between the at least one reference acquisition device and each of the acquisition devices of the array is smaller or equal to:

$$\frac{Z*\cos\alpha}{h*\cos(\alpha+\gamma)}*ArrayCamGSD$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of the array to the highest ground point in the images and the at least one reference image;

γ is the grazing angle of the array in respect of the average ground plain within the images and the reference images; and ArrayCamGSD is the minimal Ground Sampling Distance (GSD) of each of the array cameras.

In accordance with an embodiment of the presently disclosed subject matter, there is yet further provided a method wherein at least one of the reference images overlaps at least part of each of the images.

In accordance with an embodiment of the presently disclosed subject matter, there is yet further provided a method wherein at least one of the reference images overlaps the centers of each of the images.

In accordance with an embodiment of the presently disclosed subject matter, there is yet further provided a method wherein at least one of the reference images overlaps at least half of the area covered by each of the images.

In accordance with an embodiment of the presently disclosed subject matter, there is yet further provided a method wherein the calibrating is at least one of geometric calibrating and radiometric calibrating.

In accordance with an embodiment of the presently disclosed subject matter, there is yet further provided a method wherein the at least one reference image has at least one superior parameter over the images.

In accordance with an embodiment of the presently disclosed subject matter, there is yet further provided a method wherein the at least one reference image is of superior geometric accuracy.

In accordance with an embodiment of the presently disclosed subject matter, there is yet further provided a method wherein at least two of the images are of a narrower field of view than the at least one reference image.

In accordance with an embodiment of the presently disclosed subject matter, there is yet further provided a method further comprising utilizing the at least one reference image for adjusting at least one parameter of at least two of the images.

In accordance with an embodiment of the presently disclosed subject matter, there is yet further provided a method wherein the parameter is a geometrical parameter.

In accordance with an embodiment of the presently disclosed subject matter, there is yet further provided a method wherein the geometrical parameter is one of the following:
 a. Position;
 b. Orientation;
 c. Focal length;
 d. Scale;
 e. Lens distortion.

In accordance with an embodiment of the presently disclosed subject matter, there is yet further provided a method wherein the images and the at least one reference image cover a substantially unchanged scene.

In accordance with an embodiment of the presently disclosed subject matter, there is yet further provided a method wherein the images and the at least one reference image are acquired during a single imaging pass.

In accordance with an embodiment of the presently disclosed subject matter, there is yet further provided a method wherein the images and the at least one reference image are acquired substantially simultaneously.

In accordance with an embodiment of the presently disclosed subject matter, there is yet further provided a method wherein the images are acquired using an array of at least four acquisition devices and the at least one reference image is acquired using at least one reference acquisition device, and wherein the images and the at least one reference image are acquired from a moving platform, and wherein the time difference between acquiring the at least one reference image and each of the images is smaller or equal to:

$$\frac{Z*\cos\alpha}{h*\cos(\alpha+\gamma)}*ArrayCamGSD/V_{Platform}$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

$\alpha$ is the elevation angle of the array to the highest ground point in the images and the at least one reference image;

$\gamma$ is the grazing angle of the array in respect of the average ground plain within the images and the reference images;

ArrayCamGSD is the minimal Ground Sampling Distance (GSD) of each of the array cameras; and $V_{Platform}$ is the velocity of the moving platform.

In accordance with an embodiment of the presently disclosed subject matter, there is yet further provided a method wherein at least one of the images does not overlap any other image of the images.

In accordance with an embodiment of the presently disclosed subject matter, there is yet further provided a method further comprising associating each of the images with at least one of corresponding global positioning data and orientation data.

The system and/or method according to the subject matter of the present application can have features of different aspects described above or below, or their equivalents, in any combination thereof, which can also be combined with any feature or features of the system and/or method described in the Detailed Description presented below, or their equivalents.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 8a is one example of an overlap situation between images of a camera array and a reference image, according to certain embodiments of the invention;

FIG. 8b is another example of an overlap situation between images of a camera array and a reference image, according to certain embodiments of the invention;

FIG. 8c is still another example of an overlap situation between images of a camera array and a reference image, according to certain embodiments of the invention.

DETAILED DESCRIPTION

Figure 1:
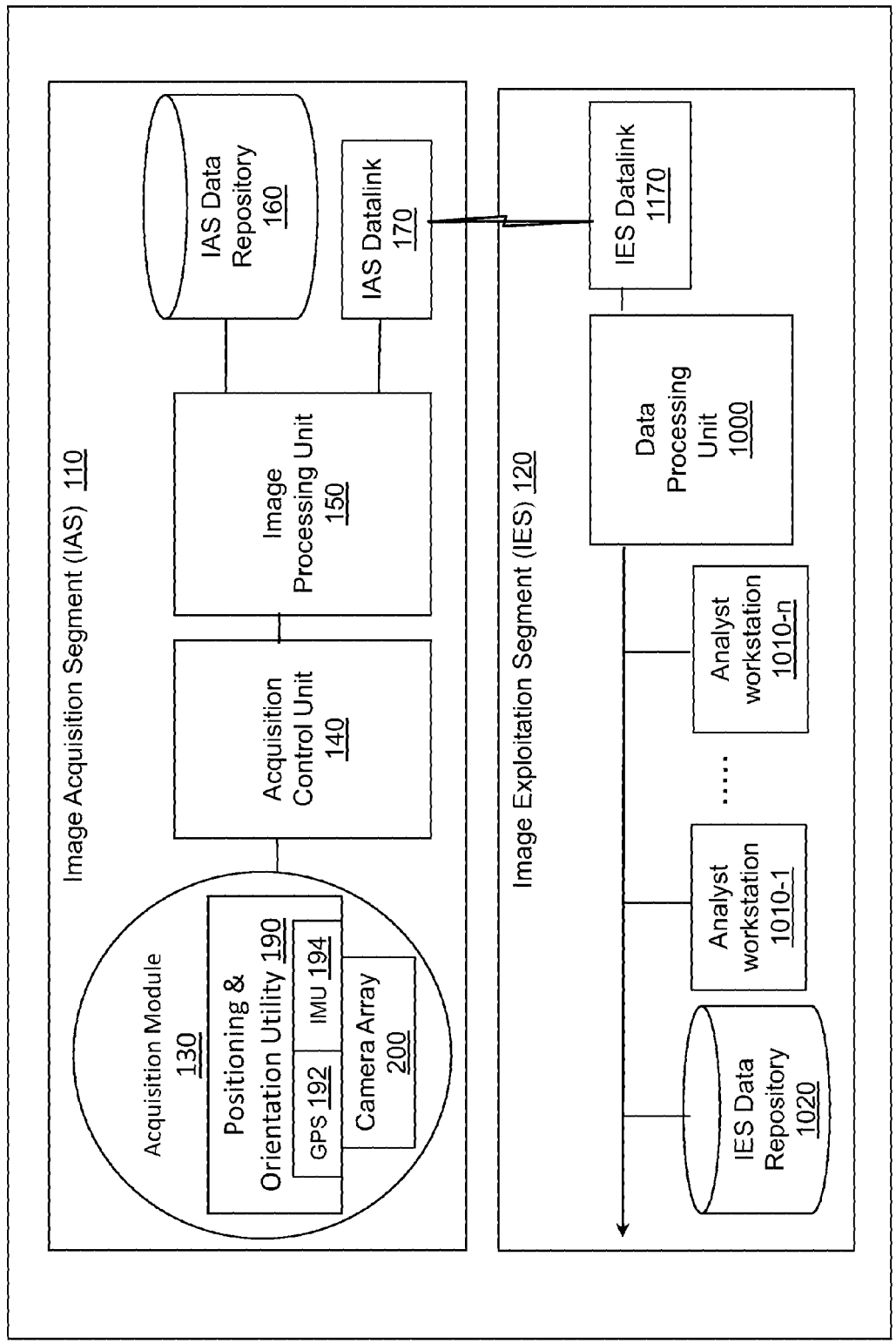
FIG. 1 is a schematic example of a system for calibrating multi-camera array images, according to certain embodiments of the invention.

In the following drawings and detailed description, identical reference numerals indicate those components that are common to different embodiments or configurations.

Unless specifically stated otherwise, as apparent from the following discussions, it is appreciated that throughout the specification discussions utilizing terms such as "calibrating", "adjusting", "acquiring", "extracting", "utilizing", "associating", or the like, refer to the actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, for example, as described in the subject matter of the present application. The computer may enable the teachings of the subject matter of the present invention either by being specially constructed for the desired purposes or by being a general purpose computer configured for the desired purpose by a computer program stored in a computer readable storage medium.

The system and method according to the subject matter of the present application can have features of different aspects described above or below, or their equivalents, in any combination thereof, which can also be combined with any feature or features of the system and method described in the Detailed Description presented below, or their equivalents.

Unless stated otherwise all technical and scientific terms used herein may have the same meaning as understood by one of ordinary skill in the art.

As used herein, the phrase "for example," "such as" and variants thereof describe non-limiting embodiments of the present invention. Reference in the specification to "one embodiment", "an embodiment", "some embodiments", "another embodiment", "other embodiments", "certain embodiments" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments" or variants thereof does not necessarily refer to the same embodiment(s).

Figure 4:
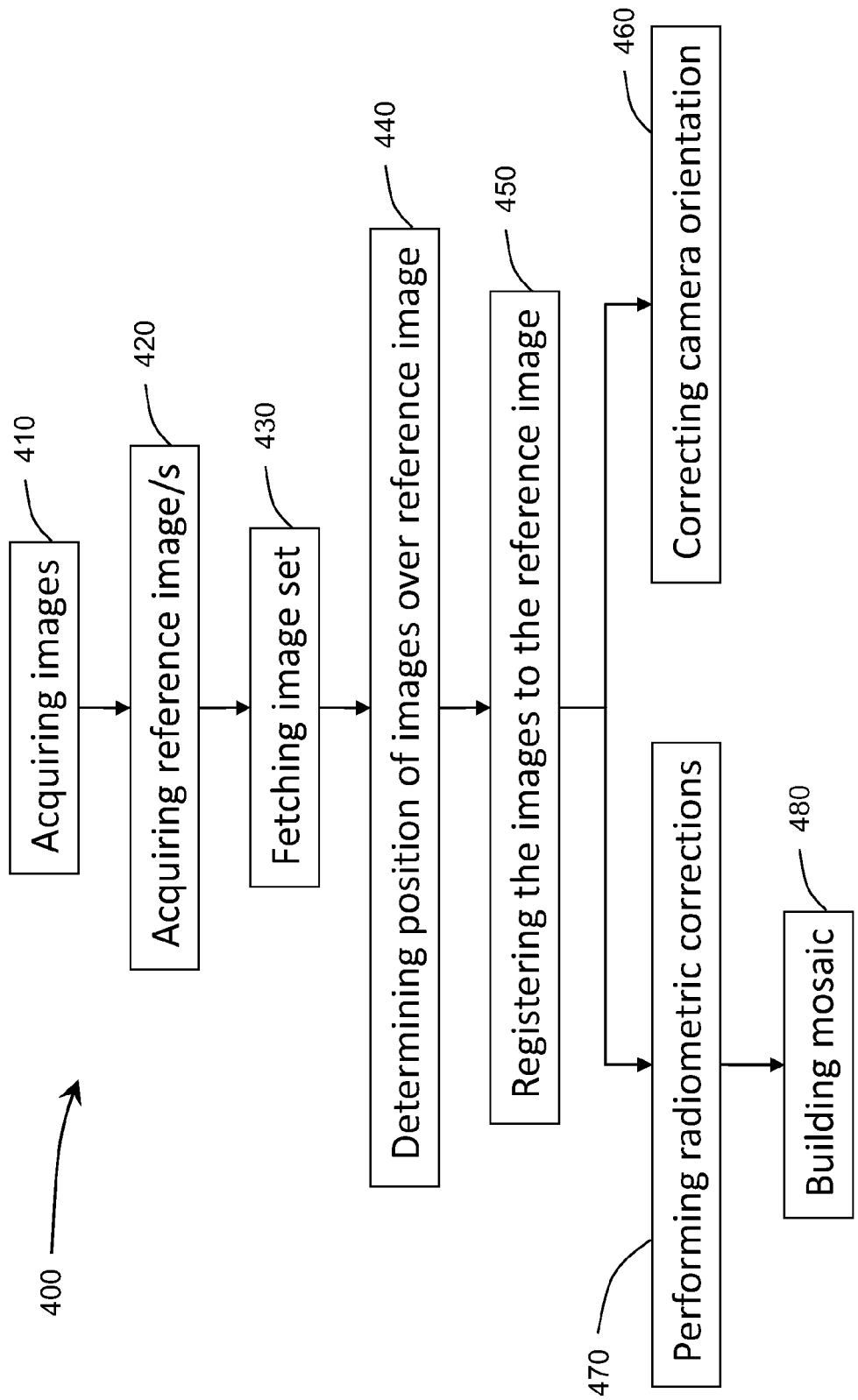
FIG. 4 is a flowchart illustrating a sequence of operations carried out for calibrating multi-camera array images, according to certain embodiments of the invention.
Figure 5:
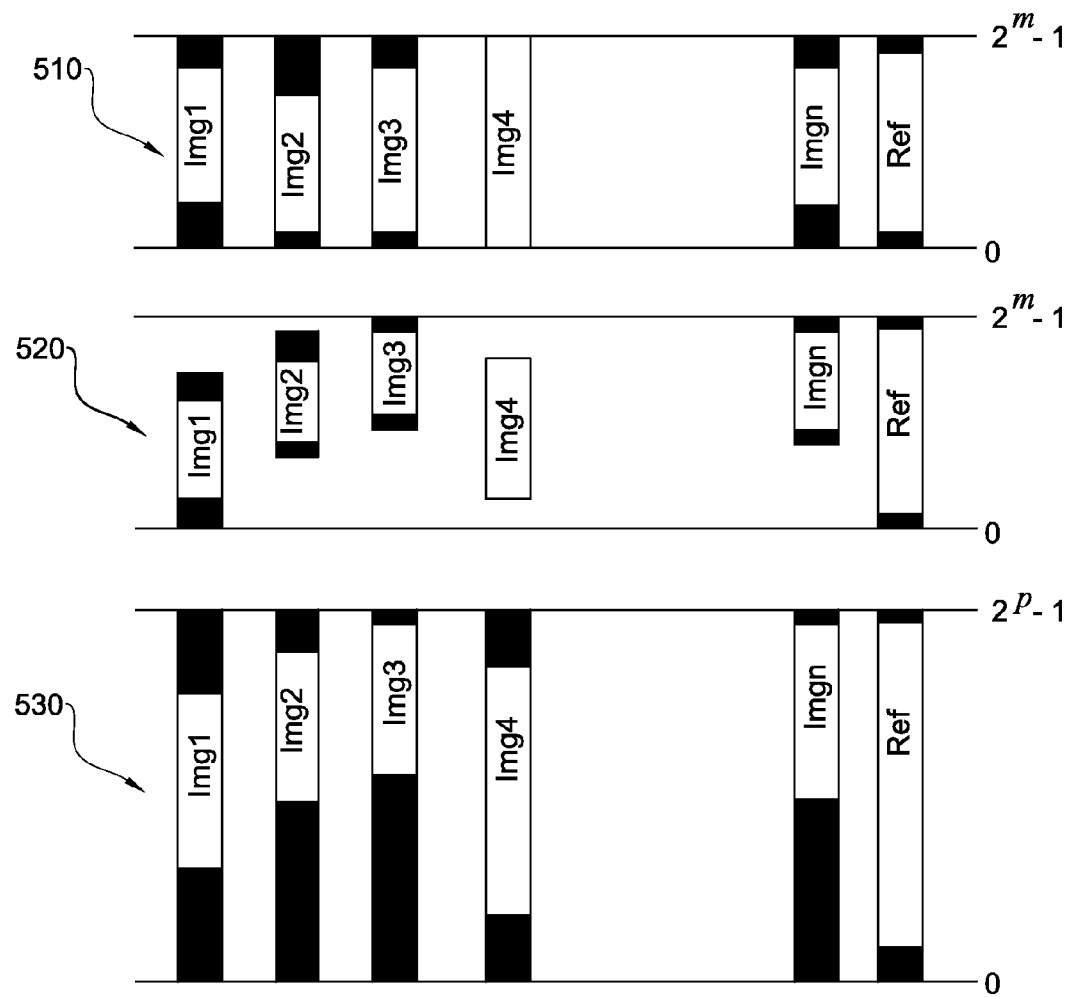
FIG. 5 is an illustration of a histogram matching process, according to certain embodiments of the invention.
Figure 6:
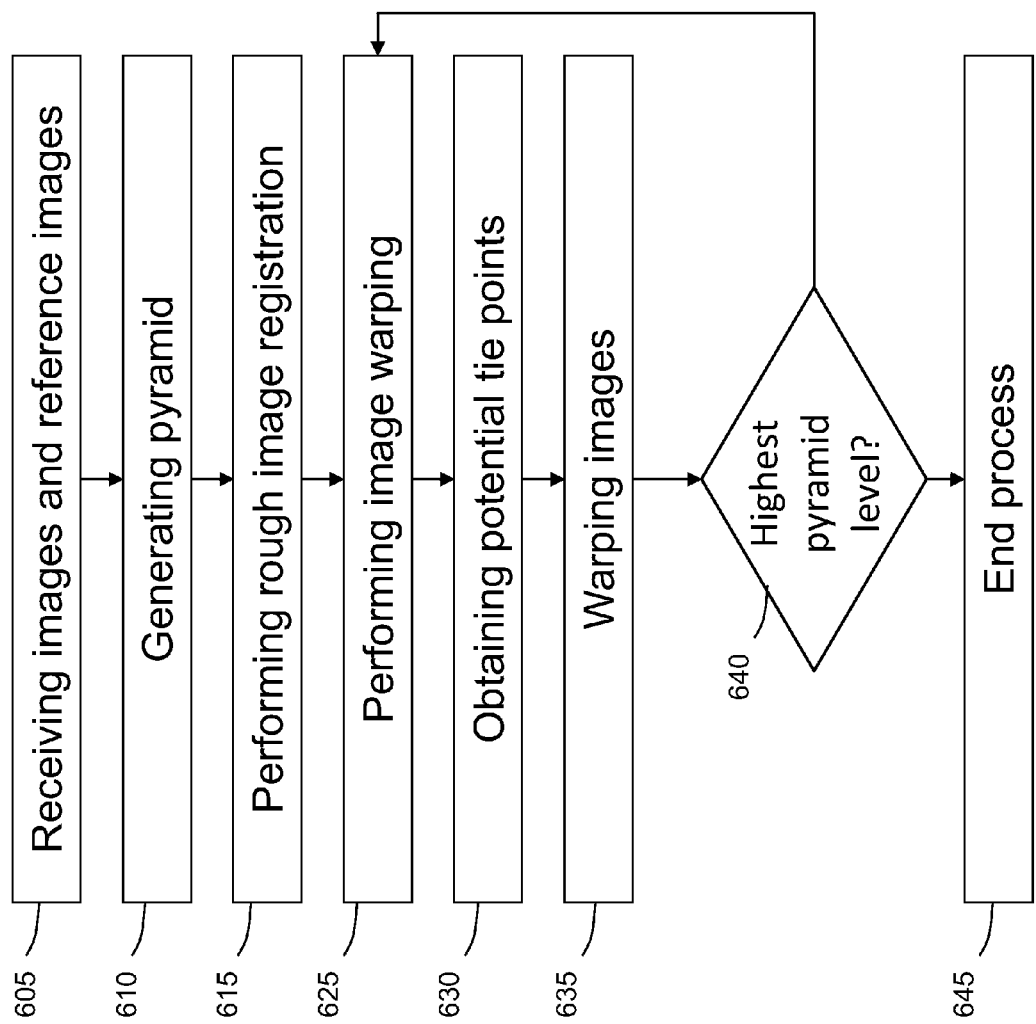
FIG. 6 is a flowchart illustrating a drill down sequence of operations carried out for registering multi-camera array images to a reference image, according to certain embodiments of the invention.

In embodiments of the invention, fewer, more and/or different stages than those shown in FIGS. 4, 5 and 6 may be executed. In embodiments of the invention one or more stages illustrated in FIGS. 4, 5 and 6 may be executed in a different order and/or one or more groups of stages may be executed simultaneously. FIG. 1 illustrates a general schematic of the system architecture in accordance with an embodiment of the invention. Each module in FIG. 1 can be made up of any combination of software, hardware and/or firmware that performs the functions as defined and explained herein. The modules in FIG. 1 may be centralized in one location or dispersed over more than one location. In other embodiments of the invention, the system may comprise fewer, more, and/or different modules than those shown in FIG. 1.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and in various general references.

Turning to a detailed description of embodiments of the invention, FIG. 1 shows a schematic example of a system for processing multi-camera array images, according to certain embodiments of the invention. System 100 can be configured as a distributed system (e.g. different parts and/or components of system 100 can be located in different locations). One non-limiting example of system 100 is described herein with reference to FIG. 1.

In some cases, system 100 can comprise an Image Acquisition Segment (IAS) 110 and an Image Exploitation Segment (IES) 120.

IAS 110 comprises an Acquisition Module 130, an acquisition Control Unit 140, an Image Processing Unit 150, and a data repository (IAS data repository 160).

IAS 110 also comprises at least one Processing Unit (not shown) which is configured to manage, control and execute relevant IAS 110 components and operations.

Acquisition module 130 comprises a Camera Array 200, comprising at least two Digital Acquisition Devices (hereinafter: "array cameras") capable of acquiring digital images (hereinafter: "images") and at least one Reference Digital Acquisition Device (hereinafter: "reference camera/s"), also capable of acquiring digital images (hereinafter: "reference image/s"), as further described in detail with respect to FIG. 2 below. The array cameras and the reference camera/s can be, for example, still cameras, video cameras, etc. As described in greater detail below, the reference image/s captured by the reference camera/s (hereinafter: "reference image/s") can be used for geometric and/or radiometric calibration of the images captured by the array cameras.

Acquisition Module 130 can further comprise at least one Positioning and Orientation Utility 190, configured to determine the position and orientation of the array cameras and the reference camera/s. In some cases, Positioning and Orientation Utility 190 can comprise a Global Navigation Satellite System (GNSS), such as a Global Positioning System (GPS) 192 and an Inertial Measurement Unit (IMU) 194. Positioning and Orientation Utility 190 can be configured to determine the position and orientation of acquisition module 130. The position and orientation data determined by Positioning and Orientation Utility 190 can be utilized along with knowledge of the acquisition module physical structure (as further detailed with respect to FIG. 2 below) in order to calculate the position and orientation of each of the array cameras and the reference camera/s (for example, knowledge of the position and orientation of Positioning and Orientation Utility 190 and of the position and orientation of each of the array cameras and reference camera/s with respect to Positioning and Orientation Utility 190 can enable such determination). It can be appreciated that the calculated data of the position and orientation of each the array cameras and reference camera/s along with data of various characteristics of each the array cameras and reference camera/s (e.g. its focal length, lens distortion model and other deviations of line of sight) can enable calculation of the ground position of the captured images.

Acquisition Control Unit 140 can be configured, inter alia, to control the operation of all or part of the array cameras and the reference camera/s. Inter alia, Acquisition Control Unit 140 can be configured to control the orientation of each of the array cameras and each of the reference camera/s. It is to be noted that for this purpose, each of the array cameras and each of the reference camera/s can, in some cases, be rotated and/or tilted independently (as further detailed below, with reference to FIG. 2). Alternatively or additionally, in some cases Acquisition Module 130 itself can be rotated and/or tilted as a whole. It is to be further noted that in some cases only part of the array cameras (e.g. one or more of the array cameras) and/or part of the reference camera/s can be rotated and/or tilted while the others cannot be rotated and/or tilted (as a non limiting example, the middle Digital Acquisition Device of the array may be static whereas the other Digital Acquisition Devices may be rotated and/or tilted). In addition, Acquisition Control Unit 140 can be configured to instruct the array cameras and the reference camera/s to grab one or more images at a specific time (e.g. a pre-determined time, according to a command received from an operator, repeatedly every pre-determined time interval, etc.). Such image grabbing instruction can be issued to all or part of the array cameras and/or reference camera/s synchronously or, in some cases, a-synchronously. Acquisition Control Unit 140 can be also configured to receive data from the array cameras and/or reference camera/s and/or positioning and orientation utility 190 and transmit (e.g. stream) the received data to IAS data repository 160 and/or to IAS Data-Link Module 170.

Image Processing Unit 150 can be configured to perform various operations, including real-time operations, on the acquired data (including the acquired images). For example, Image Processing Unit 150 can activate image compression algorithms for compressing the acquired images data. Image processing unit 150 can in some cases activate target tracking algorithms while utilizing the images acquired by the array cameras and/or reference camera/s. Image processing unit 150 can be configured to identify deviations of any of the array cameras and/or reference cameras Line-of-Sight (LOS) for repositioning or reorienting them when required. It is to be noted that these are mere examples and Image Processing Unit 150 can be configured to perform, additionally or alternatively, other operations. It is to be noted that in some cases, the algorithms can be activated in real-time.

IAS data repository 160 can be configured to store various data (including, inter alia, the acquired images and the acquired reference image/s in case of still cameras, acquired video streams received from the array cameras and from the reference camera/s in case of video cameras, meta-data thereof, etc.) and to enable retrieval, update and deletion of the stored data.

IAS 110 can further comprise a Data-Link Module (IAS Data-Link Module 170). IAS Data-Link Module 170 can be configured to enable communication between IAS 110 and IES 120. For example, IAS Data-Link Module 170 can be configured to transmit data (e.g. images) and meta-data (e.g. data about the images) to IES 120 and to receive data (e.g. commands, etc.) from IES 120.

In some cases, the bandwidth between IAS 110 and IES 120 may be limited (as, for example, in some cases IAS 110 can be located remotely from IES 120, e.g. on board a moving platform such as an airplane, a moving vehicle, etc.), whereas the amount of data to be transmitted to IES 120 (e.g. data acquired by Acquisition Module 130 components) can be large (for example, there may be a large number of array cameras and/or reference camera/s resulting in a large amount of images and/or reference image/s). Thus, image processing unit 150 can be utilized, for example to compress the data to be transmitted to IES 120 in order to enable optimal utilization of the bandwidth between IAS 110 and IES 120. Alternatively or additionally, some of the data to be transmitted can be temporarily stored in IAS data repository 160 that can be used as a buffer until available bandwidth enables transmission of the data to be transmitted to IES 120. Still further, in some cases, when IAS 110 is at a position remote from IES 120 and/or there is no connection between IAS 110 and IES 120 (for example due to the distance between IAS 110 and IES 120, due to connection difficulties, etc.), the acquired data (all or part of it) can be stored in IAS data repository 160 and transferred to IES 120 periodically (e.g. when a connection between IAS 110 and IES 120 can be established, when IAS 110 is in proximity to IES 120 which enables for example connecting IAS 110 and IES 120 with a cable or transfer of IAS data repository 160 to IES 120, etc.).

It is to be noted that IAS data repository 160 can in some cases store the acquired data as backup to any data transmitted from IAS 110 to IES 120.

Turning to IES 120, it comprises a Data Processing Unit 1000. Data Processing Unit 1000 can be configured, inter alia, to utilize the data acquired by IAS 110, for example for performing geometric and/or radiometric calibration of the acquired image, as detailed below. Data Processing Unit 1000 can also be configured to build a mosaic based on such calibrated images. Data Processing Unit 1000 is further configured to manage, control and execute relevant IES 120 components and operations.

IES 120 can further comprise a data repository (IES data repository 1020). IES data repository 1020 can be configured to store various data (including, inter alia, the acquired images, the acquired reference image/s, meta-data thereof, etc.) and to enable retrieval, update and deletion of the stored data.

IES 120 can further comprise a data-link module (IES Data-Link Module 1170). IAS Data-Link Module 1170 can be configured to enable communication between IAS 110 and IES 120. For example, IES Data-Link Module 1170 can be configured to transmit data (e.g. commands, etc.) to IAS 110 and to receive data (e.g. images, etc.) and meta-data (e.g. data about the images) from IAS 110.

IES 120 can still further comprise one or more analyst workstations (1010-1, . . . , 1010-n), on which, for example, the calibrated images and/or a mosaic thereof can be presented to an analyst for various purposes. In some cases, analyst workstations (1010-1, . . . , 1010-n) can also enable an analyst to edit the images and/or the mosaic.

It is to be noted that although system 100 has been described (by way of example) with reference to FIG. 1, in some cases system 100 can be centralized (i.e. not distributed), whereas in other cases system 100 can be distributed in another manner (e.g. data processing unit 1000 can be located on IAS 110 and/or IES data repository 1020 can be located on IAS 110 and/or acquisition control unit 140 can be located on IES 120 and/or image processing unit 150 can be located on IES 120, etc.).

In some cases, image processing unit 150 and/or data processing unit 1000 can be configured to calculate a required Forward Motion Compensation (FMC) for each of the array cameras and/or reference camera/s. In some cases (for example when the array cameras and/or reference camera/s are located onboard an aircraft, a car or other moving objects) the forward motion of the object at the time of image acquisition, may cause a drag of the acquired image. One solution for such a problem is moving or orienting the array cameras and/or the reference camera/s in a way that compensates for the forward motion of the array cameras and/or the reference camera/s relative to the ground. It is to be noted that the array cameras can be oriented in different viewing angles relative to the ground, thus it may be required that each frame be compensated by a different angular movement, that can be calculated by image processing unit 150 and/or data processing unit 1000 while utilizing known methods and/or techniques. It can be appreciated that FMC can be implemented on array cameras and/or reference camera/s that can be tilted and/or rotated.

It is to be noted that according to examples of the presently disclosed subject matter, the system 100 can be autonomous (e.g. when all the necessary components are part of system 100).

Figure 2:
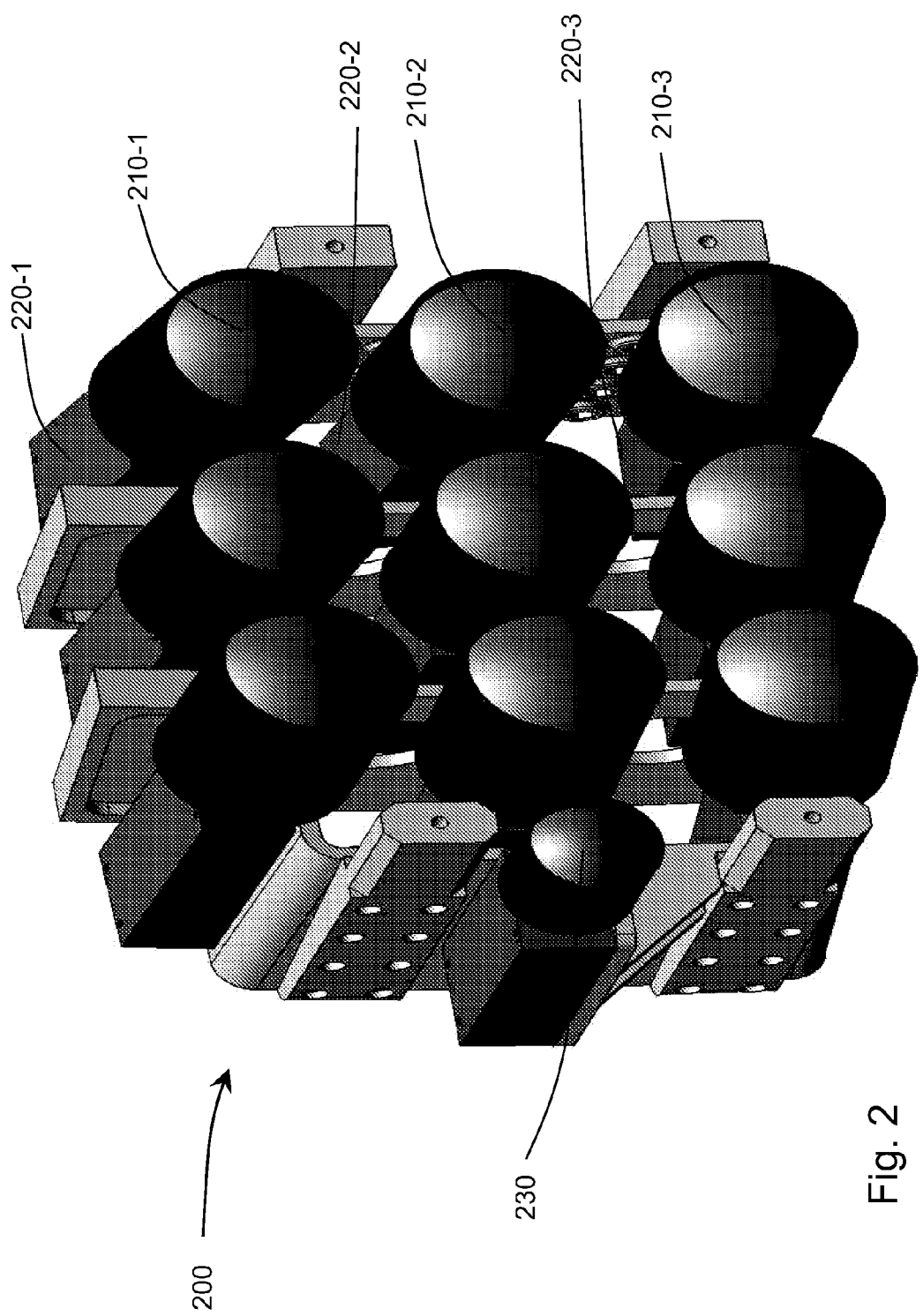
FIG. 2 is a schematic example of a multi-camera array, according to certain embodiments of the invention.

Turning to FIG. 2, there is shown a schematic example of a multi-camera array, according to certain embodiments of the invention. In the depicted example, camera array 200 comprises nine array cameras (210-1, 210-2, . . . , 210-9). The array cameras (210-1, 210-2, . . . , 210-9) can be still cameras and/or video cameras. The array cameras can be off-the-shelf digital acquisition devices and/or digital acquisition devices designed for that purpose. The array cameras can be identical (e.g. same manufacturer, same model, same parameters as further detailed below, etc.) or of different kinds (e.g. various manufacturers, various models, various parameters as further detailed below). Although in the example shown in FIG. 2 there are nine array cameras, arranged in a 3×3 formation, this is a mere non-limiting example. Camera array 200 can comprise at least two digital acquisition devices (and in some cases at least four digital acquisition devices). In addition, camera array 200 can be arranged in many other various formations. For example, the array cameras can be arranged in a single line, a circle, a matrix, in a sporadic manner, or in any other formation, in any location on camera array 200. The array cameras and/or the reference camera/s can be pre-calibrated, however this is not mandatory and they can also, in some cases, not be pre-calibrated, as further detailed below.

In some cases, all or part of the array cameras can be connected to a rotatable and/or tiltable platform (220-1, 220-2, . . . , 220-9). Such tilting and/or rotating can enable, inter alia, performance of FMC (as detailed above) by system 100 (e.g. by acquisition control unit 140). Alternatively or additionally, camera array 200 can be connected to a rotatable and/or tiltable platform that enables it be rotated and/or tilted by system 100 as a whole (e.g. by acquisition control unit 140).

Camera array 200 further comprises at least one reference camera 230. In the depicted example, camera array 200 comprises one reference camera 230. Reference camera 230 can be a still camera and/or a video camera. Reference camera 230 can be an off-the-shelf digital acquisition device and/or digital acquisition device designed for that purpose. The reference camera/s (e.g. reference camera 230) can be off-the-shelf digital acquisition devices and/or digital acquisition devices designed for that purpose. In case more than one reference camera exists, the reference cameras can be identical (e.g. same manufacturer, same model, same parameters as further detailed below, etc.) or of different kinds (e.g. various manufacturers, various models, various parameters as further detailed below). Although in the example shown in FIG. 2 there is one reference camera, this is a mere non-limiting example. Camera array 200 can comprise any number of reference cameras. In addition, the reference camera/s can be arranged in various formations on camera array 200 (as another non-limiting example, the reference camera can be located in the middle of camera array 200 or on any other location). When more than one reference camera exists, the reference cameras can be arranged, for example, in a single line, a circle, a matrix, sporadically, or in any other formation, in any location on camera array 200. In some cases there is a limitation of a maximal distance between reference camera/s and the farthest array camera.

Figure 3:
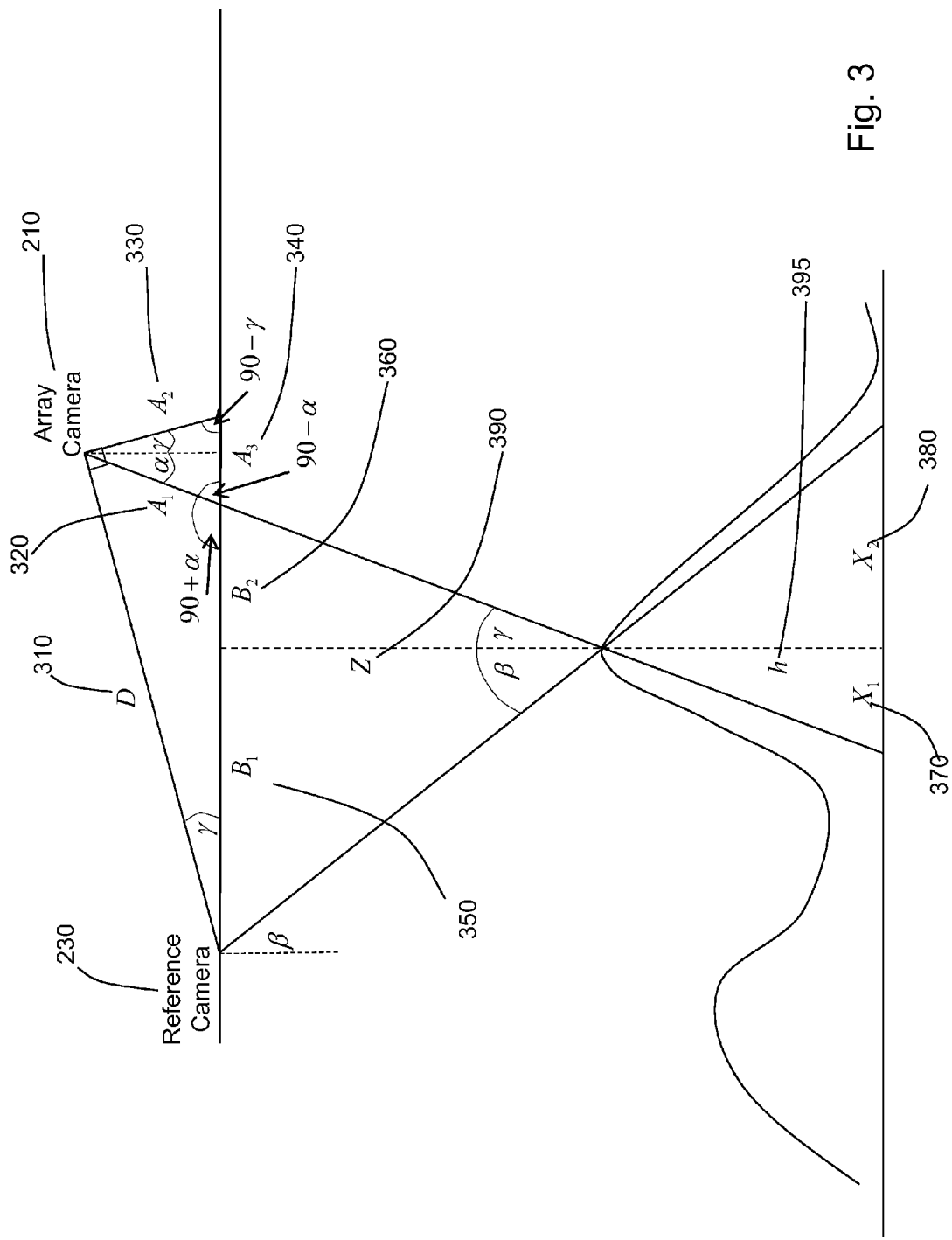
FIG. 3 is an illustration of a limitation of a maximal distance between the array cameras and the reference camera/s that can be utilized as reference camera/s for these array cameras.

Reverting to FIG. 3, there is shown an illustration of a limitation of a maximal distance between the array cameras and the reference camera/s that can be utilized as reference camera/s for these array cameras (hereinafter: "the limitation"). In the drawing, D 310 is the maximal allowed distance between the array cameras 210 and the reference camera/s 230 that can be utilized as reference camera/s for these array cameras. Looking at the triangle defined by the sides D 310, A1 320, B1+B2 (350 and 360 respectively) it can be appreciated that $$\frac{D}{\sin(90+\alpha)} = \frac{A_1}{\sin\gamma} = \frac{B_1+B_2}{\sin(90-\gamma-\alpha)},$$

i.e. $\frac{D}{\cos\alpha} = \frac{A_1}{\sin\gamma} = \frac{B_1+B_2}{\cos(\alpha+\gamma)}.$ The limitation requires that X1+X2 (370, 380 respectively) will be smaller than the minimal Ground Sampling Distance (GSD) of each of the array cameras (ArrayCamGSD) for which the reference camera/s can be utilized as reference camera/s. It is to be noted that GSD is the spacing of areas represented by each pixel in a digital photo of the ground (e.g. in a digital image with a one-meter GSD, each pixel represents a ground area of 1 square meter). Thus, $(X_1+X_2)_{Allowed} <$ ArrayCamGSD. From the concept of similarity of triangles it can be further appreciated that $$\frac{X_1+X_2}{h} = \frac{B_1+B_2}{Z}.$$

Utilization of the formulas provided above results in the conclusion that the maximal distance between the array cameras and the reference camera/s that can be utilized as reference camera/s for these array cameras is:

$$D_{Allowed} = \frac{Z*\cos\alpha}{h*\cos(\alpha+\gamma)} * ArrayCamGSD$$

Where:

Z 390 is the minimal vertical distance between the highest ground point in the scene captured by such reference camera and the array cameras and such reference camera;

H 395 is the distance between the highest ground point in the scene and the lowest ground point in the scene;

α is the elevation angle of the array or reference camera to the highest ground point in the scene; and γ is the grazing angle of camera array 200 in respect of the average ground plain.

Returning to FIG. 2, in some cases, all or part of the array cameras can be connected to a rotatable and/or tiltable platform (240). Such tilting and/or rotating can enable, inter alia, performance of FMC (as detailed above) by system 100 (e.g. by acquisition control unit 140).

In some cases, all or part of the array cameras can have a narrower Field of View (FOV) than the at least one reference camera (i.e. the images captured by the array cameras cover a smaller geographical area than the geographical area covered by the images captured by the reference camera/s).

In some cases, the reference camera/s can have at least one superior parameter (as further detailed below) over all or part of the array cameras. In some cases, such superior parameter can be geometric accuracy. In other cases, the reference camera/s can have no such superior parameter. As further detailed below, in such cases system 100 can utilize the images captured by the reference camera/s for improving and/or adjusting the radiometric and/or geometric characters of the images captured by the array cameras. Such geometric characters can be, for example, position, orientation, focal length, scale, lens distortion, deviation of line of sight, etc.

In some cases, one or more of the reference cameras can be geometrically pre-calibrated. In such cases, utilization of such pre-calibrated reference camera/s can enable improving and/or adjusting the geometric and geographic accuracy.

As noted above, camera array 200, all or part of the array cameras and all or part of the reference camera/s can be tilted and/or rotated. This can enable system 100 to direct them at a specific target (e.g. a pre-defined target, a target selected in real time by an operator, etc.), and, in some cases, also to track a specific target (that can be identified, for example, automatically or by an operator). All or part of the array cameras and/or reference camera/s can have various (and variable) Zoom levels, therefore in some cases it may be desired to tilt and/or rotate the array cameras and/or reference camera/s for example according to the selected zoom level (e.g. in some cases at some zoom values, there may be a large overlap for example between the areas covered by the array cameras and it may be desired to reduce such overlap or to eliminate it altogether, as further detailed below).

Figure 7A:
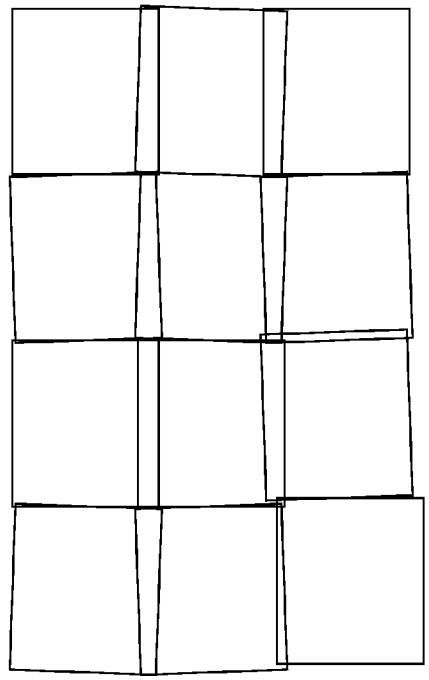
FIG. 7a is one example of an overlap situation between images of a camera array, according to certain embodiments of the invention.
Figure 7B:
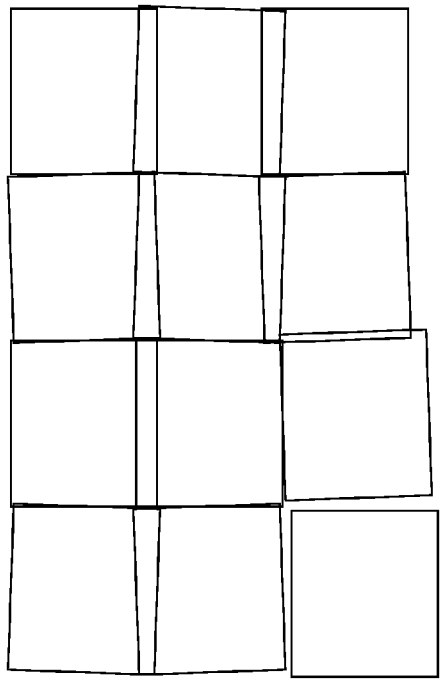
FIG. 7b is another example of an overlap situation between images of a camera array, according to certain embodiments of the invention.
Figure 7C:
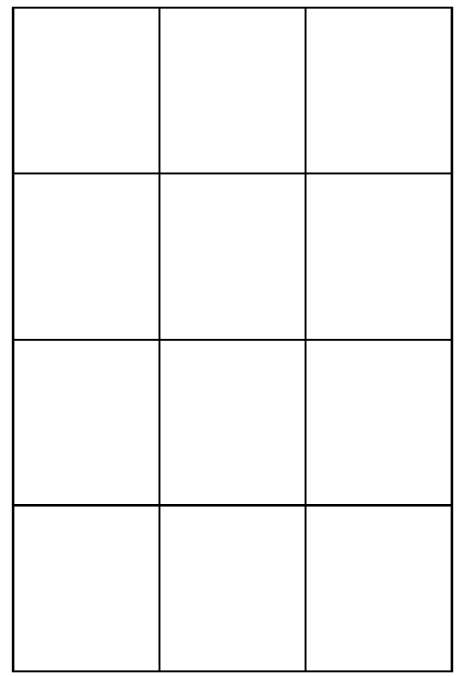
FIG. 7c is still another example of an overlap situation between images of a camera array, according to certain embodiments of the invention.

FIG. 4 is a flowchart illustrating a sequence of operations carried out for calibrating multi-camera array images, according to certain embodiments of the invention. Process 400 begins with at least one of the array cameras acquiring images (step 410) and at least one of the reference camera/s acquiring reference image/s (step 420). When utilizing the presently disclosed subject matter, various overlap situations between the acquired images can exist:

1. There can be some overlap between every adjacent couple of images (as shown in FIG. 7a, which is one example of an overlap situation between images of a camera array, according to certain embodiments of the invention. Each rectangle in FIG. 7a illustrates an image);

2. There can be one or more images that do not overlap any other image (as shown in FIG. 7b, which is another example of an overlap situation between images of a camera array, according to certain embodiments of the invention. Each rectangle in FIG. 7b illustrates an image);

3. There can be no overlap between any of the images (as shown in FIG. 7c is still another example of an overlap situation between images of a camera array, according to certain embodiments of the invention. Each rectangle in FIG. 7c illustrates an image).

For purpose of calibrating the images by utilizing the reference image/s, there must be at least a partial overlap between the images to be calibrated and at least one of the reference image/s to be utilized for the calibration of the images to be calibrated. In some cases, all images are to be calibrated, and in such cases all images must have an overlap with the reference image/s (in respect of which the images are to be calibrated). When utilizing the presently disclosed subject matter, various overlap situations between the acquired images and the reference image/s can exist:

1. There can be a complete overlap between the acquired images and the reference image/s (as shown in FIG. 8a, which is one example of an overlap situation between images of a camera array and a reference image, according to certain embodiments of the invention. Each rectangle in FIG. 8a illustrates an image whereas reference numeral 810a refers to a reference image);

2. There can be at least a partial overlap between each of the acquired images and the reference image/s (as shown in FIG. 8b, which is another example of an overlap situation between images of a camera array and a reference image, according to certain embodiments of the invention. Each rectangle in FIG. 8b illustrates an image whereas reference numeral 810b refers to a reference image);

3. There can be an overlap between the area that is confined at least by the centers of each of the outer acquired images and the reference image/s (as shown in FIG. 8c, which is still another example of an overlap situation between images of a camera array and a reference image, according to certain embodiments of the invention. Each rectangle in FIG. 8c illustrates an image whereas reference numeral 810c refers to a reference image);

4. There can be an overlap between at least half of the area covered by each of the acquired images and the reference image/s.

It is to be noted that other overlap situations between the images and the reference image/s can also exist.

Acquisition control unit 140 can be configured to synchronize at least one of the array cameras and at least one of the reference camera/s to acquire the images and the reference images within a pre-determined time window. In some cases, the images and the reference images can be acquired simultaneously (e.g. the time window can be zero or substantially zero). In other cases, the time window can be more than zero. It is to be noted that acquisition module 130 can be located on a moving platform such as an aircraft, a vehicle, etc. Therefore, it can be appreciated that the time window for acquiring the images and the reference images also depends on the characteristics of the platform on which acquisition module 200 is located. One such exemplary platform characteristic is the platform speed. Thus, for example, the faster the platform on which the acquisition module 200 is located is moving, the smaller the time window for acquiring the images and the reference images is, and vice versa. The maximal time difference allowed between every image and the reference images depends on the platform speed and the location and orientation of the acquisition module 130 in relation to the ground target using the following equation:

$$T_{Allowed} = \frac{D_{Allowed}}{V_{Platform}} = \frac{Z*\cos\alpha}{h*\cos(\alpha+\gamma)} * ArrayCamGSD/V_{Platform}$$

Where:

$V_{Platform}$ is the velocity of the moving platform;

Z is the minimal vertical distance between the highest ground point in the scene captured by such reference camera and the array cameras and such reference camera;

h is the distance between the highest ground point in the scene and the lowest ground point in the scene;

$\alpha$ is the elevation angle of the array or reference camera to the highest ground point in the scene; and $\gamma$ is the grazing angle of camera array 200 in respect of the average ground plain.

Thus, as non limiting examples:

a UAV platform flying at 60 m/s shall have a time frame of 75 millisecond for acquiring the images and the reference image/s where Z=3000 m, h=100 m, GSD=0.15 m and $\alpha \cong \gamma \cong 0$.

A jet aircraft platform flying at 200 m/s shall have a time frame of 22.5 millisecond for acquiring the images and the reference image/s where Z=3000 m, h=100 m, GSD=0.15 m and $\alpha \cong \gamma \cong 0$.

Additionally or alternatively, acquisition control unit 140 can be configured to acquire the images and the reference image/s within a time window greater than zero, for example when the captured images and reference image/s cover a substantially unchanged scene. An unchanged scene is a scene having similar (and in some cases, identical) light conditions, similar (and in some cases, identical) objects within the scene and similar (and in some cases, identical) locations of the objects within the scene. Thus, the time window can be more than zero (or more than substantially zero) when the scene was captured in similar light conditions, and the scene contains substantially stationary objects and/or other objects that substantially did not change (and in some cases, did not change at all) their position between the time that the images were captured and the time that the reference image/s were captured. It is to be noted that the scene must be similar enough so as to enable obtaining tie points between the images and the reference image/s.

In some cases, the images and the reference image/s acquired by at least one of the array cameras and at least one of the reference camera/s can be acquired during a single imaging pass or a single imaging mission (e.g. one or more passes over a certain scene to be photographed). In case the platform on which the acquisition module 200 is located performs more than one pass (or more than one additional pass) over the scene to be photographed during a single imaging mission, the time window for acquiring the images and the reference image can be more than zero (or substantially zero) seconds. In such cases, the scene must remain similar enough (for example between the first imaging pass and the second imaging pass) so as to enable obtaining tie points between the images and the reference image/s.

The images and the reference image/s can be stored, along with various metadata thereof in IAS data repository 160. The metadata can comprise, inter alia, the date and time during which the images and the reference image/s were acquired, the position and orientation from which the images and the reference image/s were acquired, the Imaging Field of View (FOV), the images and reference image/s gain, etc. Additionally or alternatively, the images and the reference image/s and the metadata thereof can be transmitted to IES 120 via data-link module 170. In such cases, the images and the reference image/s and the metadata thereof can be stored in IES data repository 1020.

In the following description reference will be made to the operations of IES 120, and specifically to the operations of data processing array 1000, however, it is to be noted that these operations can additionally or alternatively be carried out by IAS 110 and specifically by image processing unit 150. In some cases, the operations described below can be divided between IAS 110 and IES 120.

Data processing array 1000 can be configured to fetch an image set (step 430). In some cases, the image set can be the latest set of images and reference image/s (prior, or in parallel to storing it in IES data repository 1020) acquired during the pre-determined time-window. Alternatively, the image set can be fetched from IES data repository 1020 (or IAS data repository 160, for example in case the operations are performed by IAS 110). In case the image set is fetched from a data repository (e.g. IES data repository 1020, IAS data repository 160), data processing array 1000 can be configured to retrieve the set of simultaneously acquired images and reference image/s. In some cases, when one or more of the cameras are video cameras, data processing array 1000 can be configured to extract the relevant images from the video captured by the video cameras (for example according to the video time information).

Data processing array 1000 can be further configured to determine the estimated position of the image set images over the image set reference image/s (step 440). For this purpose, data processing array 1000 can utilize information about camera array 180 formation. Knowledge of the FOV of each of the array cameras and reference camera/s and the relative position and orientation of each of the array cameras with respect of the reference camera/s enable calculation of an estimated position of each the images in respect of the reference image/s.

Data processing array 1000 can also be configured to register the images to the reference image/s (step 450). Such registration enables determination of the position of each pixel of the image set images over the image set reference image/s plane. The process of registering the images to the reference image/s is further detailed below with reference to FIG. 6.

In some cases, data processing array 1000 can be further configured to perform corrections of camera orientation and/or position with respect to the reference camera/s (step 460). Such correction of camera orientation can be performed according to an instruction provided by an operator to re-orient one or more of the array cameras and/or reference camera/s. Additionally or alternatively, such corrections of camera orientation can be performed in response to detection of a deviation of one or more of the array cameras and/or reference camera/s, relative to their expected orientation.

In some cases, data processing array 1000 can be further configured to perform radiometric corrections (step 470). It can be appreciated that radiometric discontinuities and/or discrepancies can exist between images and/or between images and the reference image/s. Such discontinuities and/or discrepancies appear, for example, around junctions and intersections between images (the differences can be a result, for example, of using cameras of different kinds, cameras having different parameters or configurations, different automatic gain correction applied independently to each image, different lighting conditions of each camera, etc). Therefore, radiometric corrections can be performed on one or more of the images in order to reduce or remove any such discontinuities and/or discrepancies. It is to be noted that when more than one reference image exists, the process of radiometric corrections can be performed also between the reference images themselves.

The radiometric discontinuities and/or discrepancies can be resolved for example through a process of histogram matching between the images and the reference image/s. FIG. 5 illustrates an example of a histogram matching process, according to certain embodiments of the invention. Looking at the example illustrated in FIG. 5, it can be appreciated that at the initial stage (510) the images, and the reference image can use different radiometric ranges. It is to be noted that in some cases the reference image and/or one or more of the images can be of different radiometric resolutions. At the second stage (520), each of the images is radiometrically matched (e.g. using histogram matching) to its corresponding portion in at least one reference image and a radiometric transformation between these images is calculated.

At the third stage (530), In order to avoid deteriorating the original radiometric resolution of the images, the radiometric range of the original reference image can be rescaled using a factor equal to the maximal radiometric shrinkage ratio of each one of the array images due to the transformation calculated at stage (520). Subsequently a reference image, with an extended radiometric resolution (p-bit resolution) which accommodates the full radiometric range of the array of images after their relative transformation, is obtained. Following such rescaling, each image of the array is converted to a "p-bit" resolution image using the concatenation of two transformations: image-n to reference radiometric transformation and m-bit reference to p-bit reference transformation.

It is to be noted that such a process of histogram matching does not deal with some un-modeled effects that cause, for example, vignetting, parallax effects, small miss-registration errors, radial distortion. etc. There are various methods for dealing with such effects, one of which is the blending scheme provided in [Brown, M., Lowe, D.: *Invariant features from interest pointgroups. In: Proceedings of the 13th British Machine Vision Conference, Cardiff*, pp. 253-262 (2002)] and originally developed by: Burt, P. J., Adelson, E. H.:*A multiresolution spline with application to image mosaics. ACM Trans. Graph.* 2(4), 217-236 (1983).

In some cases, data processing array 1000 can be still further configured to build to a mosaic out of the images and the reference image/s (step 480). It should be noted that at this stage, it may be desirable to perform a final step for correction of the overall radiometry of the final mosaic image wherein a histogram matching to the entire mosaic image can be applied. In some cases, the histogram matching process can use the extended dynamic range histogram of the reference image/s. Performance of such histogram matching to the entire mosaic image can result in a seamless continuous mosaic image with the similar radiometric appearance to the reference image/s.

Turning to FIG. 6, there is shown a flowchart illustrating a drill down sequence of operations carried out for registering multi-camera array images to a reference image, according to certain embodiments of the invention. The registration process begins with receiving images and reference image/s as input (step 605). The received images and reference image/s can be images and reference image/s that were captured simultaneously or substantially simultaneously. In some cases, for each of the images and the reference image's, at least one lower resolution image is created, for example by successively low pass filtering and decimating the images (step 610). In some cases more than one lower resolution images are created, each having a resolution lower than its preceding images, thereby forming a pyramid structure of images, each having a lower resolution than the previous images.

Following creation of such an images pyramid, a rough images registration can be performed (step 615). In some cases, data of the position and orientation of the array cameras and the reference camera/s (for example data obtained by positioning and orientation utility 190) can be utilized in order to calculate an approximate position of the images over the reference image/s. In some cases, additional data (such as, for example, the array cameras and the reference camera/s FOV, etc.) can be utilized as well for such calculation. Following determination of the approximate position of the images over the reference image/s, a global transformation between pixels of the lowest resolution pyramid images and pixels of the reference image/s is determined. Such rough registration results in a global approximate transformation between the coordinates of the pixels of the images and the pixels of the reference image/s.

Following the rough images registration, a process of fine registration can take place. The calculated global transformation can be applied on the input images in order to warp the images onto the reference image/s, at the higher pyramidal levels (step 625). Additionally, potential tie points, between the images and the reference image/s, to be used in the fine registration process are obtained (step 630). There are various known methods and techniques for obtaining potential tie points. One example is covering the images by a virtual grid, virtually dividing them to rectangles, and scanning each of the virtual rectangles for a potential tie point. Such tie points should preferably have an even distribution across the images (a situation wherein no tie points are located for some parts of the images should be avoided). By way of non limiting example, the density of the grid (the size of each rectangle) can be determined in accordance with the method described in R. Haralick and L. Shapiro, *Computer and ROBOT Vision*, Vol. 2, Reading, Mass.: Addison-Wesley, 1993. In some cases, following division of the images to rectangles, the center pixel of each rectangle is defined as a potential tie point. Another example of searching for tie points, that does not include using such a virtual grid, is using image analysis for looking for tie points that possess the following characteristics:
 a. Uniqueness in its surrounding (e.g. distinctness, etc.);
 b. Invariant to shifts, rotation and scale transformations;
 c. Repetitive (e.g. reproducible under different imaging geometries).

It is to be noted that these are mere examples for searching for tie points and other methods and techniques can be used additionally or alternatively.

It is to he noted that according to the presently disclosed subject matter, there can be situations in which some, or all, of the images do not overlap any other image, except the reference image/s. In such cases, no tie points between the images themselves can be obtained for such images. However, in accordance with the presently disclosed subject matter, there is at least a partial (and in some cases a complete) overlap between each of the images and the reference image/s. Such an overlapping area can be utilized in order to obtain tie points between each of the images and the reference image/s.

It is to be noted that even in situations where each of the images overlaps at least one other image, utilization of a reference image that overlaps a larger area of one or more of the images enables obtaining tie points from a larger area than the overlapping area between the images. As any person of ordinary skill in the art can appreciate, the larger the overlapping area, the more potential (and actual) tie points can be obtained, thus enabling better image registration and calibration. Thus, in cases where there is a complete overlap between the images and the reference image/s, the entire images area can be utilized for obtaining tie points.

Figure 9:
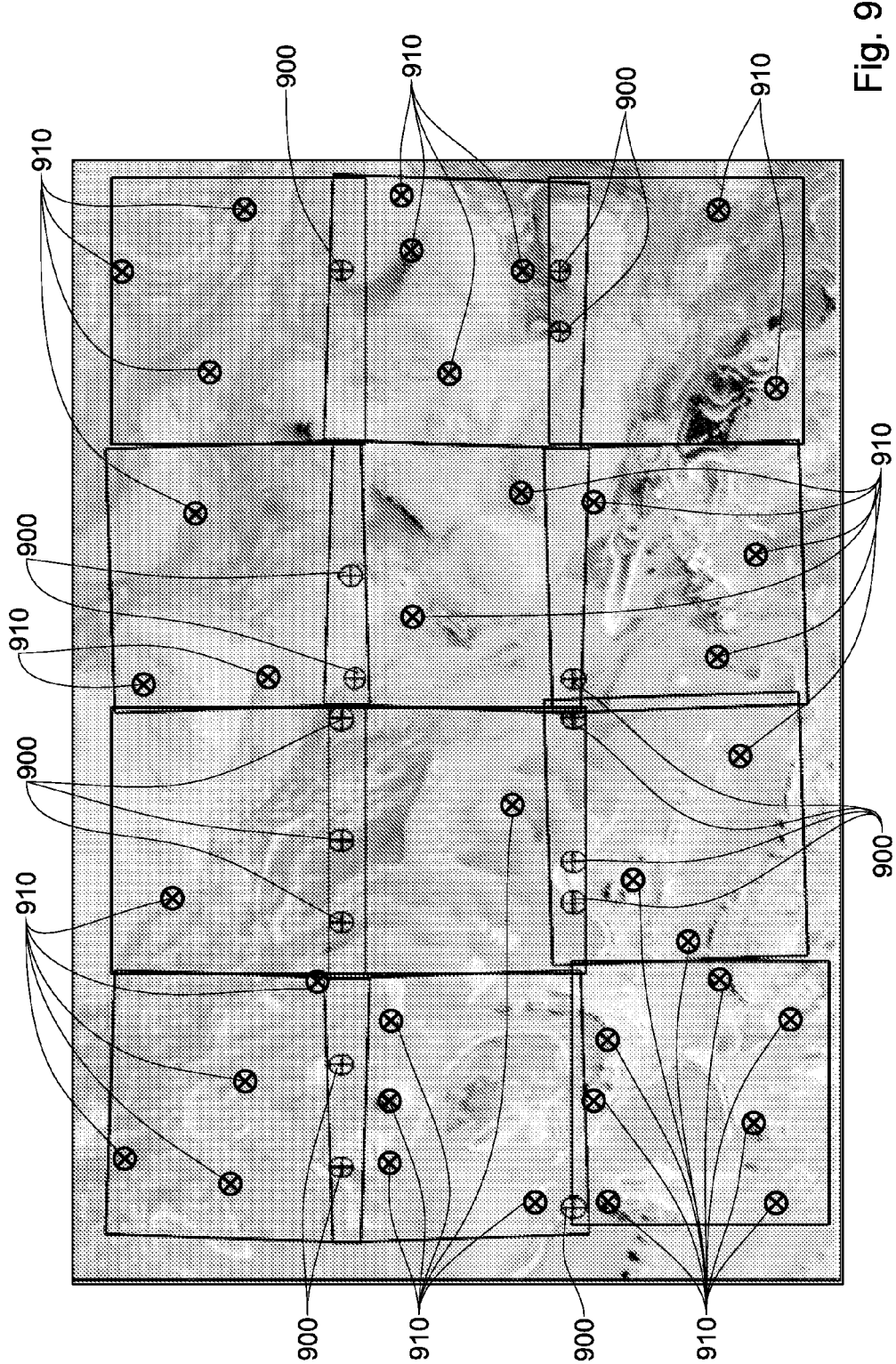
FIG. 9 is an example of available tie points when a reference image is utilized, and available tie points when no reference image is utilized.

Looking at FIG. 9, there is shown an example of available tie points when a reference image is utilized, and available tie points when no reference image is utilized. It can be appreciated that the area from which tie points can be obtained when utilizing a reference image/s is larger than the area from which tie points can be obtained when not using a reference image/s. When not utilizing a reference image/s, tie points can be obtained from the overlapping area between each couple of images (see, for example, tie points 900), whereas, when utilizing a reference image/s, additional tie points can be obtained also from the overlapping area between each of the images and the reference image/s (see, for example, tie points 910).

Returning to FIG. 6, once potential tie points are obtained, the images can be warped over the reference image/s (step 635). For this purpose, in some cases a mapping function between each image and the reference image/s can be computed. Such mapping function can enable calculating a global transformation between the coordinates of each pixel within the images and the corresponding coordinates in the reference image/s. The flapping function can be, for example, a polynomial transformations function (e.g. an affine transformation, etc.), a 2D perspective transformation, etc.

However, in some cases one or more of the images (and in some cases, each of the images) can have a different mapping function with respect to the reference image/s. In addition, when using high order polynomial function for example, the mapping function can in some cases behave erratically, particularly in regions where no tie points have been obtained.

In some cases, a local transformation model that operates locally can be used.

For example, such a local transformation model can be an affine transformation defined by:

$$(x,y,1)=(u,v,1)\hat{T}_{WLS}(u,v);$$

Where (x,y) are the coordinates of the tie point in the image and (u,v) are the corresponding coordinates in the reference image and $T_{WLS}$ represents a locally weighted least square estimation of the six affine coefficients. As an example, $T_{WLS}$ can be calculated according to the following:

$$\hat{T}_{WLS}=(U^TWU)^{-1}U^TWX;$$

Where:

$$X = \begin{bmatrix} x_1 & y_1 & 1 \\ x_2 & y_2 & 1 \\ \vdots & \vdots & \vdots \\ x_n & y_n & 1 \end{bmatrix} U = \begin{bmatrix} u_1 & v_1 & 1 \\ u_2 & v_2 & 1 \\ \vdots & \vdots & \vdots \\ u_n & v_n & 1 \end{bmatrix}$$

and X and U represent tie points coordinates from all of the images. It is to be noted that the weight W is computed in accordance with the distance between the pixel to be transformed to all the other calculated tie points in the image plane. The weighting matrix W is a diagonal matrix and the elements of the diagonal i=1, 2, . . . , n can be, as a non limiting example, given by:

$$w_{ii}=w_{corr}*\exp(-k*d);$$

Where $w_{corr}$ is the maximal correlation surface peak, normalized between 0 and 1;

k=−log(0.5)/($D_0$);

$D_0$—is a correlation window size;

And d is the Euclidian distance between the $i^{th}$ tie point ($u_i$, $v_i$) and the image point (u,v).

It is to be noted that for a pixel located exactly at the location of one of existing calculated tie points, the Euclidian distance d equals zero, and therefore the weight becomes identical to $w_{corr}$. For pixels with distances equal to the correlation window size ($D_0$), the adapted weight used equals half the weight obtained by correlation in the registration process. It can be appreciated that changing the constant $D_0$ allows one to control the degree to which the final mapping is more locally confined, for example to account for the local distortions induced by a specific application. It is to be noted that as the warping process slides from one image to a neighboring image, the affine transformation can vary continuously such that the transition between the images remains continuous.

It can be appreciated that such warping of the e images over the reference image/s results in calibration of the images over the reference image/s, including adjustment of various parameters, such as, inter alia, geometrical parameters such as position, orientation, focal length, scale, lens distortion, etc.

In some cases, the images can be warped over the reference image/s for the lower resolution images at the first stage and then for each of the higher resolution to pyramid images one by one, thus gradually warping the images over the reference image. In such cases, a check can be performed if the current processed image is the highest pyramid level image (step 640). If so—the process ends (step 645). If not—the process returns to step 625 and repeats the subsequent steps until reaching the highest pyramid level.

It is to be noted that in some cases, the rough images registration stages can be skipped. In some cases, additionally or alternatively to skipping the rough images registration stages, the pyramid generation stage can be skipped. In such cases, for example, potential tie points between the input images and reference image/s can be used in order to register the images over the reference image/s.

While the claimed subject matter has been shown and described with respect to particular embodiments, it is not thus limited. Numerous modifications, changes and improvements within the scope of the claimed subject matter will now occur to the reader. It will be appreciated that the embodiments described above are cited by way of example, and various features thereof and combinations of these features can be varied and modified.

The invention claimed is:

1. A system for calibrating multi-camera array images, comprising:
 a. an array of at least four acquisition devices, configured to acquire images;
 b. at least one reference acquisition device configured to acquire at least one reference image at least partially overlapping at least four of said images;
 wherein the distance between at least one reference acquisition device and each of at least one of the acquisition devices of said array is smaller or equal to:

$$\frac{Z*\cos\alpha}{h*\cos(\alpha+\gamma)}*ArrayCamGSD$$

wherein Z is the minimal vertical distance between the at least one reference acquisition device and the highest ground point in the images and in the at least one reference image;
 h is the distance between the highest ground point in the images and the at least one reference image and the lowest ground point in the images and the at least one reference image;
 α is the elevation angle of said array to the highest ground point in the images and the at least one reference image;
 γ is the grazing angle of said array in respect of the average ground plain within said images and said reference images; and
 ArrayCamGSD is the minimal Ground Sampling Distance (GSD) of each of the array cameras, and
 wherein said at least one reference acquisition device is of superior geometric accuracy with respect to the at least four acquisition devices, and
 c. a processor configured to extract tie points between said at least four of said images and said at least one reference image and utilize said tie points for calibrating said at least four of said images in respect of said at least one reference image.

2. The system of claim 1 wherein at least one of said reference images overlaps one or more of the following:
 (a) at least part of each of said images;
 (b) the centers of each of said images;
 (c) at least half of the area covered by each of said images.

3. The system of claim 1 wherein said calibrating is at least one of the geometric calibrating and radiometric calibrating.

4. The system of claim 1 wherein at least one of said array, said acquisition devices and said reference acquisition device is adjustable.

5. The system of claim 1 wherein said acquisition devices are still cameras or video cameras and wherein said at least one reference acquisition device is a still camera or a video camera.

6. The system of claim 1 wherein at least two of said images are of a narrower field of view than said at least one reference image.

7. The system of claim 1 wherein said processor is further configured to utilize said at least one reference image for adjusting at least one of the following parameters of more than two of said images:
 a. Position;
 b Orientation;
 c. Focal length;
 d. Scale;
 e. Lens distortion.

8. The system of claim 1 wherein said images and said at least one reference image cover a substantially unchanged scene.

9. The system of claim 1 wherein said images and said at least one reference image are acquired during a single imaging pass or substantially simultaneously.

10. The system of claim 1 wherein said system is mounted on a moving platform and wherein the time difference between acquiring said at least one reference image and each of said images is smaller or equal to:

$$\frac{Z*\cos\alpha}{h*\cos(\alpha+\gamma)}*ArrayCamGSD/V_{Platform}$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of said array to the highest ground point in the images and the at least one reference image;

γ is the grazing angle of said array in respect of the average ground plain within said images and said reference images;

ArrayCamGSD is the minimal Ground Sampling Distance (GSD) of each of the array cameras; and $V_{Platform}$ is the velocity of said moving platform.

11. The system claim 1 wherein at least one of said images does not overlap any other image of said images.

12. A method for calibrating multi-camera array images, comprising:
 a. acquiring at least four images;
 b. acquiring at least one reference image at least partially overlapping at least four of said images;
 c. extracting tie points between said at least four images and said at least one reference image and utilizing said tie points for calibrating said at least four images in respect of said at least one reference image,
 wherein the images are acquired using an array of at least four acquisition devices and the at least one reference image is acquired using at least one reference acquisition device,
 wherein the distance between the at least one reference acquisition device and at least one of the acquisition devices of said array is smaller or equal to:

$$\frac{Z*\cos\alpha}{h*\cos(\alpha+\gamma)}*ArrayCamGSD$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of said array to the highest ground point in the images and the at least one reference image;

γ is the grazing angle of said array in respect of the average ground plain within said images and said reference images; and ArrayCamGSD is the minimal Ground Sampling Distance (GSD) of each of the array cameras, and wherein said at least one reference acquisition device is of superior geometric accuracy with respect to the at least four acquisition devices or is geometrically pre-calculated.

13. The method of claim 12 wherein at least one of said reference images overlaps one or more of the following:
 (a) at least part of each of said images;
 (b) the centers of each of said images;
 (c) at least half of the area covered by each of said images.

14. The method of claim 12 wherein said calibrating is at least one of geometric calibrating and radiometric calibrating.

15. The method of claim 12 wherein at least two of said images are of a narrow field of view than said at least one reference image.

16. The method of claim 12 further comprising utilizing said at least one reference image for adjusting at least one of the following parameters of at least two of said images
 a. Position;
 b. Orientation;
 c. Focal length;
 d. Scale;
 e, Lens distortion.

17. The method of claim 12 wherein said images and said at least one reference image cover a substantially unchanged scene.

18. The method of claim 12 wherein said images and said at least one reference image are acquired during a single imaging pass or substantially simultaneously.

19. The method of claim 12 wherein the images are acquired using an array of at least four acquisition devices and the at least one reference image is acquired using at least one reference acquisition device, and wherein said images and said at least one reference image are acquired from a moving platform, and wherein the time difference between acquiring said at least one reference image and each of said images is smaller or equal to:

$$\frac{Z*\cos\alpha}{h*\cos(\alpha+\gamma)}*ArrayCamGSD/V_{Platform}$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of said array to the highest ground point in the images and the at least one reference image;

γ is the grazing angle of said array in respect of the average ground plain within said images and said reference images;

ArrayCamGSD is the minimal Ground Sampling Distance (GSD) of each of the array cameras; and $V_{Platform}$ is the velocity of said moving platform.

20. The method of claim 12 wherein at least one of said images does not overlap any other image of said images.

21. At least one non-transitory computer readable medium comprising computer readable instructions that control at least one processor to implement the method of claim 12.

22. A system for calibrating multi-camera array images, comprising:
 a. an array of at least four acquisition devices, configured to acquire images;
 b. at least one reference acquisition device configured to acquire at least one reference image at least partially overlapping at least four of said images;

wherein the distance between at least one reference acquisition device and at least one of the acquisition devices of said array is smaller or equal to:

$$\frac{Z * \cos\alpha}{h * \cos(\alpha + \gamma)} * ArrayCamGSD$$

wherein Z is the minimal vertical distance between the at least one reference acquisition device and the highest ground point in the images and in the at least one reference image;

h is the distance between the highest ground point in the images and the at least one reference image and the lowest ground point in the images and the at least one reference image;

α is the elevation angle of said array to the highest ground point in the images and the at least one reference image;

γ is the grazing angle of said array in respect of the average ground plain within said images and said reference images; and ArrayCamGSD is the minimal Ground Sampling Distance (GSD) of each of the array cameras, and c. a processor configured to extract tie points between said at least four of said images and said at least one reference image and utilize said tie points for calibrating said at least four of said images in respect of said at least one reference image.

* * * * *